United States Patent

[11] 3,631,415

[72] Inventors Roger L. Aagard
Minneapolis;
Di Chen, Minnetonka; Franics M. Schmit, St. Louis Park, all of Minn.
[21] Appl. No. 857,308
[22] Filed Sept. 12, 1969
[45] Patented Dec. 28, 1971
[73] Assignee Honeywell Inc.
Minneapolis, Minn.

[54] OPTICAL MASS MEMORY
11 Claims, 3 Drawing Figs.

[52] U.S. Cl. .......... 340/174 YC, 340/174 TF, 340/174.1 M, 346/74 MT
[51] Int. Cl. .......... G11b 7/00, G11c 11/14, G11c 11/42
[50] Field of Search .......... 340/174 YC, 174.1 MO, 174.1 M; 346/74 MT

[56] References Cited

UNITED STATES PATENTS

| | | | |
|---|---|---|---|
| 3,176,278 | 3/1965 | Mayer .......... | 346/74 MT |
| 3,368,209 | 2/1968 | McGlauchlin et al. .......... | 340/174.1 |

OTHER REFERENCES

IEEE Proceedings; Vol. 57, No. 6, June 1969; pg. 1223

*Primary Examiner*—James W. Moffitt
*Attorneys*—Lamont B. Koontz, Francis A. Sirr, Robert O. Vidas and Thomas L. Johnson

ABSTRACT: An optical mass memory utilizing the Curie point writing technique wherein information is stored on a manganese bismuth film having low- and high-temperature crystallographic phases. A preheater is utilized to maintain the manganese bismuth film within a temperature range during the quiescent stage of operation in which only the low-temperature crystallographic phase exists. A laser beam provides additional thermal energy to a predetermined film spot to achieve Curie point writing. The stored information is retrieved utilizing the polar Kerr magneto-optic effect.

INVENTOR.
ROGER L. AAGARD
DI CHEN
FRANCIS M. SCHMIT
BY Robert J. Vidas
ATTORNEY.

OPTICAL MASS MEMORY

BACKGROUND OF THE INVENTION

The present invention relates to a method and system for storing information. More particularly, the present invention relates to a method and system for optically storing information on a magnetic film having a plurality of temperature dependent crystallographic phases.

Recently, a number of applications have arisen for large capacity, random access, mass storage devices. Some applications, such as the recording of high resolution video information, require a very large storage capacity on the order of $10^{10}$ to $10^{12}$ bits of information. In general the mass storage devices currently used, such as drums, disc files, magnetic card devices, and tape loop units, encounter serious problems in reliability, power consumption and size when these devices approach a storage capacity of $10^9$ bits or larger. A desirable alternative to the utilization of such electromechanical devices has been the recent development of optical information systems. Such systems are commonly referred to as optical mass memories.

The most advantageous optical information storage scheme utilizes a laser to provide Curie point writing. Such a scheme was disclosed and claimed in U.S. Pat. No. 3,368,209 to L. D. McGlauchlin et al. and assigned to the same assignee as the present invention. While the McGlauchlin et al. scheme provides advantages not found in the prior art, one difficulty with the scheme disclosed therein is that magnetic films, such as manganese bismuth, produce a leakage light signal after repeated write-erase cycling of the film. This leakage light signal has been found experimentally to occur after as few as 100 write-erase cycles. Generally, this effect saturates and stabilizes causing a reduction in the contrast between background and the written "bit" readout signals. An information storage system which substantially eliminates the leakage light signal was disclosed and claimed in copending patent application, Ser. No. 850,571, filed Aug. 15, 1969, by Di Chen and assigned to the same assignee as the present invention. While the system disclosed and claimed in the copending Chen application provides advantages not found in the prior art in addition to eliminating the leakage light signal, one difficulty with the system disclosed therein is that after extended use, the quenched high-temperature phase manganese bismuth film returns to its normal low-temperature phase. As a result of this phase transformation, the leakage light signal again occurs. Experimentally, the practical life time of the quenched high-temperature phase film has been found to be approximately one year at an operating temperature of 20° C. The present invention, on the other hand, permanently eliminates the leakage light signal.

SUMMARY OF THE INVENTION

The information storage system of the present invention includes a magnetic film having a plurality of temperature dependent crystallographic phases and conditioning means to maintain at least a portion of the film within a temperature range during the quiescent stage of operation in which the film has only a single crystallographic phase. The system further includes an energy source for providing thermal energy to heat a predetermined spot in the conditioned portion of the film above the Curie temperature. Upon cooling below the Curie temperature, the magnetization direction of the heated spot is aligned in a direction dependent upon the net magnetic field existing at the spot. By selectively changing the film's magnetization direction in a spot-by-spot manner, digital information is stored. Nondestructive readout of the store information is obtained utilizing either the Faraday or Kerr magneto-optic effects.

The utilization of film conditioning means to maintain the magnetic film in a single crystallographic phase provides distinct advantages not found in the optical information storage systems of the prior art. First, it has been found experimentally that the reduction in contrast between background and the written "bit" readout signal is caused by the written portions of the film being transferred into a different crystallographic phase as a result of repeated write-erase cycles whereas the unwritten portions of the film retain their original phase. Thus, by maintaining the film within a temperature range during the quiescent phase of operation in which only one crystallographic phase can exist, as provided by the present invention, maximum contrast in the readout signal is achieved. Secondly, by choosing the proper temperature range in which to maintain the magnetic film, the film does not undergo a phase transformation even after extended use. Thirdly, the utilization of conditioning means to preheat the magnetic film above room temperature lowers the laser power required to achieve Curie point writing. Alternatively, faster writing speeds can be achieved utilizing the same laser power as utilized for operation at room temperature.

DETAILED DESCRIPTION OF THE PREFERRED EMBODIMENTS

For purposes of this invention, a magnetic media is any ferromagnetic or ferrimagnetic material having two or more temperature dependent crystallographic phases. The Curie point associated with the magnetic media is that temperature at which the material loses its magnetization. Whereas the present invention includes all magnetic media having a plurality of temperature dependent crystallographic phases, for purposes of convenience, the discussion hereinbelow is limited primarily to manganese bismuth.

The magnetic media manganese bismuth (MnBi) has a first or low-temperature phase which is ferromagnetic. This low-temperature phase has a NiAs type crystallographic structure of orthorhombic symmetry. Normally, MnBi has the low-temperature phase crystallographic symmetry until it is heated above the Curie temperature associated therewith of approximately 360° C. When heated above this Curie temperature, MnBi undergoes a transformation into a second or high-temperature phase which is paramagnetic with a monoclinic crystallographic symmetry. See, "The Magnetic and Crystallographic Properties of MnBi Studied by Neutron Diffraction" by A. F. Anderson et al. appearing in Acta Chemica Scandinavica, Volume 21, pages 1543–1554, 1967. If a MnBi film is heated above 360° C. and rapidly cooled, the high-temperature phase is retained at room temperatures. This rapid cooling or quenching action can occur in the normal "writing" and "erasing" stages of operation on MnBi film, particularly after repeated write-erase cycles. Thus, within a certain temperature range below 360° C., different portions of the MnBi film used in an optical information storage system can have either of two crystallographic phases. As stated previously, the existence of the different crystallographic phases results in the appearance of the leakage light signal.

Figures 1, 2:
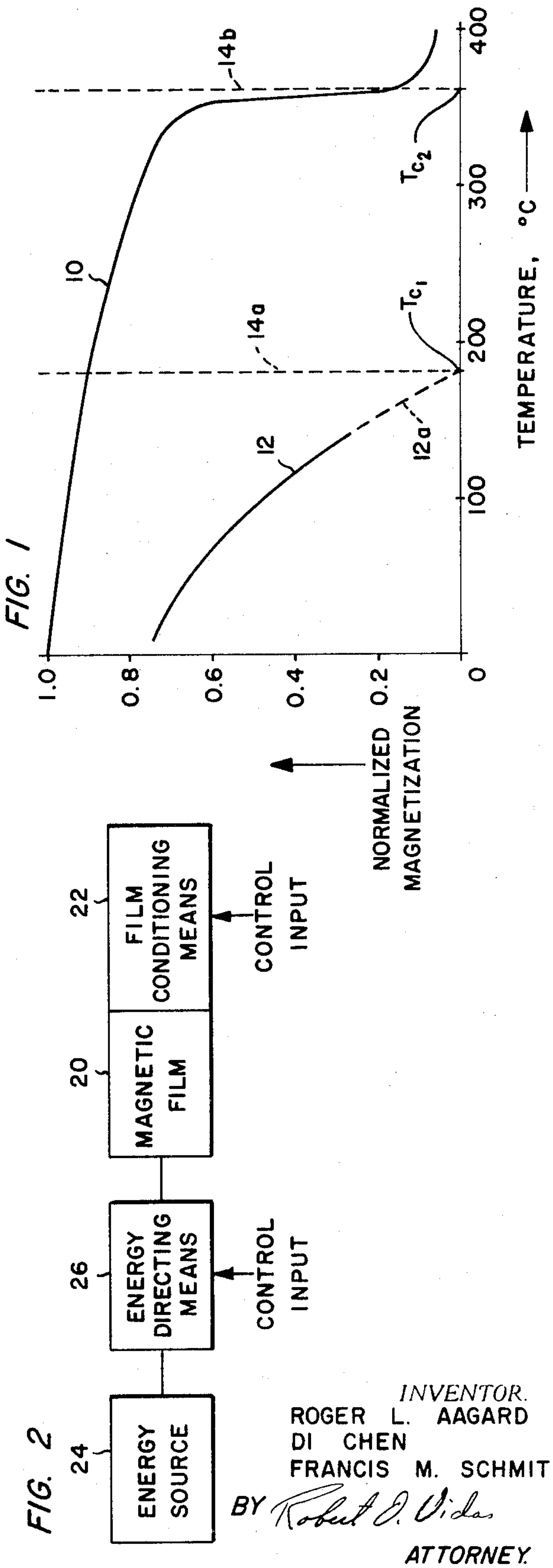
FIG. 1 is a normalized graph of temperature versus magnetization for both low-temperature phase and quenched high-temperature phase manganese bismuth films.
FIG. 2 is a schematic illustration of the recording portion of an optical mass memory in accordance with the present invention.

FIG. 1 illustrates the above-mentioned properties of MnBi. Curve 10 represents normal or low-temperature phase MnBi and curve 12 represents quenched high-temperature phase MnBi. Curves 10 and 12 were drawn using data points obtained experimentally. From the extrapolation, illustrated as dashed line 12*a*, of curve 12, it can be seen that the Curie temperature ($T_{C1}$) of the quenched high-temperature phase MnBi is in the neighborhood of 180° C. Likewise, from curve 10 it can be seen that the Curie temperature ($T_{C2}$) of low-temperature phase MnBi is in the neighborhood of 360° C. As can be seen from FIG. 1, MnBi has only one crystallographic phase, i.e., the low-temperature phase, defined by the temperature range between the dashed lines 14*a* and 14*b*. The extremes of this temperature range are defined by the quenched high-temperature phase Curie point of approximately 180° C. and the low-temperature phase Curie point of approximately 360° C.

Shown in FIG. 2 is a block diagram of the recording portion of an optical mass memory which provides a completely reversible write-erase cycle. As illustrated, the memory includes a magnetic film 20 for storing information thereon. Magnetic film 20 has a plurality of temperature dependent crystallographic phases. As explained previously, a magnetic film such as MnBi has low-temperature and high-temperature crystallographic phases. Film conditioning means 22 maintains at least a portion of film 20 in a temperature range during the nonwriting and nonerasing stage of operation within which film 20 has only a single crystallographic phase. The nonwriting and nonerasing stage of operation is commonly referred to as the quiescent stage. For purposes of the present invention, conditioning means 22 can maintain film 20, or a portion thereof, within a temperature range in which the film has only one crystallographic phase during either the entire quiescent stage of operation or only temporarily during the time intervals immediately surrounding the write and erase stages of operation. For MnBi, this temperature range is, as explained previously, between approximately 180° C. and 360° C. Film conditioning means 22 preferably includes a thermal energy source such as an electrical resistance heater and means such as a thermistor for regulating the heat supplied to film 20. However, other means for providing thermal energy such as radio frequency radiation or an optical pulse could be utilized to maintain the entire film, or at least the portion being exercised, in a temperature range in which the film has a single crystallographic phase. Energy source 24 provides additional thermal energy to heat a predetermined spot in the conditioned portion of the film to a temperature above the Curie point associated therewith. In a preferred embodiment, energy source 24 is a laser. The high coherence and intensity properties of a laser beam are desirable in an optical information storage system. However, other energy sources such as an electron beam can also be utilized. Energy-directing means 26 selectively directs the energy beam from source 24 to a predetermined spot on film 20. In a preferred embodiment, the energy director is an electro-optic (E-0) light beam deflector. E-0 deflectors such as KDP and $LiNbO_3$ are well known in the art. However, mechanical and electromechanical deflectors can also be utilized.

In operation, film conditioning means 22 maintains film 20 within a temperature range in which the film has only one crystallographic phase. Energy directing means 26 directs the energy beam from energy source 24 to a predetermined spot in a conditioned portion of film 20. The energy beam provides thermal energy to heat the predetermined spot to a temperature above the Curie point. Upon cooling of the heated spot below the Curie temperature, the magnetization direction of the heated spot is aligned in a direction dependent upon the net magnetic field existing at the location of the spot. In the absence of an external magnetic field, the closure flux surrounding the heated spot will align the magnetization direction in a direction opposite to the magnetization direction of the surrounding film media. Repeating this process in a step-by-step manner, digital information is stored on film 20. Furthermore, since during the writing phase of operation film 20 cools from a temperature above the Curie temperature to a temperature at which only one crystallographic phase can exist in the film, two or more crystallographic phases are never present in different portions of the film during the quiescent stage of operation. Thus, the write-erase process is completely reversible and the leakage signal does not appear.

Figure 3:
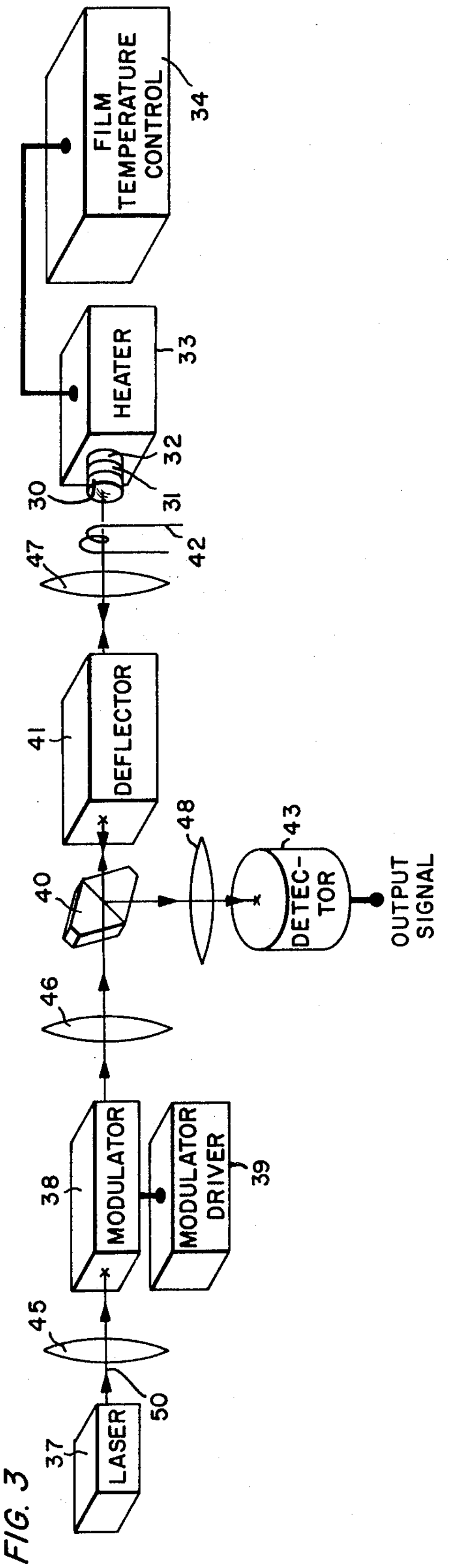
FIG. 3 is a diagrammatical illustration of a preferred embodiment of the present invention.

FIG. 3 illustrates a preferred embodiment of an optical mass memory for providing both information recording and retrieval. In this embodiment, information is stored or MnBi film 30. Film 30 is deposited in a conventional manner on a glass substrate 31. Mica and other similar materials can also be utilized as a substrate medium. In physical contact with substrate 31 is a metallic heat conductor 32. A metal with good heat conduction properties, such as aluminum, is utilized. As shown, heat conductor 32 is of substantially the same shape as substrate 31. An electrical resistance heater 33 provides heat to conductor 32 which in turn distributes the heat uniformly through substrate 31 to film 30. In a preferred embodiment, film 30 is maintained in a preheated temperature of approximately 200° C. A temperature, such as 200° C., which is just above the quenched high-temperature phase Curie point is preferred since it maximizes the power range of the laser beam which can be utilized for "reading-out" information stored in a conditioned portion of the film without raising the film temperature above the low-temperature phase Curie point. As a result of utilizing a maximized laser beam intensity level in the read stage of operation, a maximized read output signal is obtained. A MnBi film of approximately 6 inches in diameter can be uniformly maintained at 200° C. using a conventional electric heater. The power requirements of the heater varies, of course, with the design of the film holder. Film temperature control means 34 is utilized to control the amount of thermal energy heater 33 transmits to heat conductor 32. Any conventional temperature sensitive device such as a thermocouple or thermistor can be utilized.

The optical mass memory illustrated in FIG. 3 further includes a HeNe laser 37; a light modulator 38 and a modulator driver 39; a polarizing beam splitter 40; an E-0 light beam deflector 41; means 42 for applying a magnetic field to film 30; a light responsive detector 43, and light-focusing means 45, 46, 47 and 48. Laser 37 has a power output of less than 50 milliwatts. Light modulator 38 is a conventional electro-optic (E-0) modulator. For example, the modulating capabilities of $LiNbO_3$ and KDP are well known in the art. If a modulator such as a TFM 512 KDP modulator manufactured by the Isomet Corporation is used, focusing lenses 45 and 46 are no longer necessary. Polarizing beam splitter 40 is a conventional polarizing beam splitter such as a Model 328 polarizing beam splitter manufactured by Spectra Physics Corporation. However, polarizing beam splitter 40 can be replaced with a combination polarizer and a conventional half-silvered beam splitter if a certain degree of optical loss can be tolerated. Deflector 41 provides light beam deflection in either of two directions. Such two-dimensional light beam deflectors are well known in the art. See, for example, "Bright Hopes for Display Systems; Flat Panels and Light Deflectors" by R. A. Soraf and D. H. McMahon appearing in Electronics, Pages 56–62, Nov. 29, 1965. Means for applying a magnetic field to film 30 need only be a single loop coil as illustrated. Detector 43 is a conventional high frequency response photo detector. Focusing means 45, 47 and 48 are converging lenses having focal lengths dictated by the various spacings between the components of the information storage system. Focusing lens 46 is a collimating lens.

In operation, heater 33 generates sufficient thermal energy to maintain MnBi film 30 at a temperature in the neighborhood of 200° C. The actual temperature of film 30 is determined by control means 34 and any necessary temperature correction can be made either electronically or manually. To record or "write" information on MnBi film 30, thermal energy from plane polarized laser beam 50 is required to heat the film from 200° C. to a temperature above the low-temperature phase Curie point (360° C.). However, before incidence on film 30, beam 50 is focused by lens 45 onto modulator 38 and collimated by lens 46 after passing unimpeded through modulator 38. The collimated, plane polarized beam then traverses unimpeded through polarizing beam splitter 40 and is incident on E-0 deflector 41. Deflector 41 deflects light beam 50 to a predetermined portion of MnBi film 30 in response to an applied electric field. Finally, deflected beam 50 is focused to a spot of approximately 1 to 2 micrometers on film 30 in the focal plane of lens 47. Upon incidence on film 30, beam 50 heats the predetermined spot above the 360° C. Curie point.

With a Gaussian beam having a radius at the $1/e^2$ intensity level on the order of 4 micrometers, spots 1–2 micrometers in diameter can ordinarily be heated above the Curie point using microsecond duration laser pulses with less than 50 milliwatt beam power. Above the Curie temperature, the heated spot loses its magnetization. After exposure of the spot to a laser pulse sufficient to heat it above the low-temperature phase Curie point, beam 50 is reduced in intensity by modulator 38 and switched to another portion of the film by deflector 41. The heated spot then cools through the low-temperature phase Curie point returning to its quiescent stage operating temperature of 200° C. Upon cooling, the portion becomes magnetized in either a direction parallel or antiparallel to the magnetization direction direction of the surrounding film. Orientation of the spot's magnetization direction is dependent upon the existing net magnetic field. Normally, the closure flux of the surrounding film area is sufficient to align the magnetic vector of the spot in a direction antiparallel to the magnetization direction of the surrounding area. However, the closure flux of the surrounding area can be aided by an externally applied magnetic field such as could be provided by coil 42.

By heating predetermined portions of the film 30 above the low-temperature phase Curie point in a spot-by-spot manner, digital information is written or recorded on the film. It has been theoretically found that a 20 percent cumulative temperature rise occurs when the spots are heated above the Curie point at a rate of 100 kilohertz. Since a write-erase cycling rate of an individual bit greater than 100 kilohertz is not normally required in an optical mass memory, maintaining film 30 at a quiescent phase operating temperature of 200° C. will not result in a cumulative heating effect so as to raise the film above the low-temperature phase Curie point.

As illustrated, information stored on MnBi film 30 is readout utilizing the polar magneto-optic Kerr effect. Retrieval of the stored information is achieved by activating modulator 38 to attenuate the intensity of the laser beam to the extent that no appreciable temperature rise occurs when film 30 is exposed to the incident beam. A field of the proper magnitude applied to modulator 38 by modulator driver 39 achieves the desired attenuation. Upon incidence on a preselected spot of film 30, the polarized direction of plane polarized beam 50 is rotated in a direction dependent upon the magnetization direction of the spot. Approximately 40 percent of laser beam 50 is then reflected by film 30 back along the path of incidence and is again incident upon the polarizing beam splitter 40. For purposes of this specification, assume that polarizing beam splitter 40 reflects a first intensity toward detector 43 when the polarization direction of beam 50 is rotated in a direction corresponding to an antiparallel magnetic vector alignment of the preselected spot and a second intensity when the polarization direction is rotated in a direction corresponding to a parallel magnetic vector alignment. Thus, the magnitude of the signal generated by detector 43 is indicative of the preselected spot's magnetization direction. In this manner, retrieval of the information stored in film 30 is achieved. Alternatively, the information stored on film 30 can be readout utilizing the well-known Faraday effect.

Erasure of the stored information is obtained by heating a selected portion of the film above the low-temperature phase Curie point and cooling in the presence of an external magnetic field provided by field generating means 42. An erasure field in the order of 500 Oersteds is ordinarily sufficient to restore a spot of approximately 2 micrometers diameter to its original magnetization direction. Since during the quiescent stage of operation the thermal energy provided by heater 33 maintains film 30 at a temperature (200° C.) at which only the low-temperature phase can exist, the high-temperature crystallographic phase is never retained by film 30 upon cooling below the Curie point during either writing or erasing. Thus, as stated previously, the present invention provides a completely reversible write-erase cycle.

While this invention has been particularly shown and described with reference to a preferred embodiment thereof, it will be understood by those skilled in the art that changes in form and detail may be made therein without departing from the scope and spirit of the invention. This particularly true in relation to the construction and arrangement of the optical elements for providing light beam deflection, modulation and focusing.

The embodiments of the invention in which an exclusive property or right is claimed are defined as follows.

1. An optical mass memory of the Curie point writing type wherein information is stored on a magnetic film having a plurality of temperature dependent crystallographic phases and wherein the appearance of a leakage light signal which appears in optical memory systems of the Curie point writing type after repeated write-erase cycles is eliminated, the improvement comprising:

film-conditioning means for maintaining at least a portion of the magnetic film within a temperature range during the quiescent stage of operation in which only one of the plurality of crystallographic phases exists, and energy source means for providing thermal energy to heat a predetermined spot in a conditioned portion of the film above the Curie temperature associated therewith so that upon cooling below the Curie temperature to a temperature within said temperature range the magnetization direction of the predetermined spot is aligned by a net magnetic field present at the location of the predetermined spot.

2. An optical mall memory, comprising:

a magnetic film for storing information thereon having a plurality of temperature dependent crystallographic phases;

film-conditioning means for maintaining at least a portion of the magnetic film during the quiescent stage of operation within a temperature range in which only one of the plurality of crystallographic phases exists, and energy source means for providing thermal energy to heat a predetermined spot in a conditioned portion of the film above the Curie temperature associated therewith so that upon cooling below the Curie temperature to a temperature within said temperature range the magnetization direction of the predetermined spot is determined by a net magnetic field present at the location of the predetermined spot.

3. The optical mass memory as defined in claim 2 wherein:

the magnetic film has first and second crystallographic phases;

the film-conditioning means includes means for preheating substantially the entire magnetic film above the Curie temperature associated with the first crystallographic phase, and the energy source means includes a laser for providing a laser beam to heat a predetermined portion of the preheated magnetic film above the Curie temperature associated with the second crystallographic phase.

4. The optical mass memory as defined in claim 3 wherein:

the magnetic film is substantially manganese bismuth having low and high temperature crystallographic phases, and the preheating means is an electrical resistance heater adapted to maintain substantially the entire manganese bismuth film at a temperature greater than the high-temperature phase Curie point and less than the low-temperature phase Curie point.

5. The optical mass memory as defined in claim 3 including:

light-directing means for directing the laser beam to the predetermined spot of the preheated magnetic film, light-modulating means for providing a high intensity laser beam during the writing and erasing stage of operation and a low intensity laser beam during the reading stage of operation, and light-detecting means for providing an output indicative of the direction of magnetization of a preselected spot of the magnetic film.

6. The optical mass memory of claim 5 wherein:

the magnetic film is substantially manganese bismuth having high and low temperature crystallographic phases with Curie temperatures of approximately 360° C. and 180° C., respectively, associated therewith, and the preheating means is an electrical resistance heater adapted to maintain substantially the entire manganese bismuth film in the temperature range 180°–360° C.

7. The optical mass memory of claim 6 wherein:

the manganese bismuth film is deposited on a glass substrate, and the preheating means includes a metallic heat conductor having substantially the same shape as the glass substrate, the metallic conductor being positioned between the heater and substrate to provide a substantially uniform distribution of heat over the entire manganese bismuth film.

8. The method for providing a substantially reversible write-erase cycle on a magnetic film having two or more temperature dependent crystallographic phases, comprising the steps of:

maintaining at least a first portion of the magnetic film within a temperature range during the quiescent stage of operation in which only one crystallographic phase exists, and providing thermal energy to heat a predetermined spot in the first portion of the film above the Curie temperature associated therewith so that upon cooling below the Curie point to a temperature within said temperature range the predetermined spot has a magnetization direction determined by a net magnetic field present at the location of the predetermined spot.

9. The method for providing a substantially reversible write-erase cycle as provided in claim 8 wherein the magnetic film is manganese bismuth, and the thermal energy is provided by a laser.

10. A method for providing a substantially reversible write-read-erase cycle on manganese bismuth film having high and low temperature crystallographic phases with Curie temperatures of approximately 360° C. and 180° C. respectively associated therewith, comprising the steps of:

maintaining the temperature of the manganese bismuth film during the quiescent stage of operation within a temperature range of between about 180° C. and about 360° C., heating a predetermined spot of the manganese bismuth film above 360° C. with a laser beam so that upon cooling below 360° C. to a temperature within said temperature range the predetermined spot returns to the low temperature crystallographic phase and has a magnetization direction determined by a net magnetic field present at the location of said predetermined spot, reducing the intensity of the laser beam such that no appreciable temperature rise occurs when the predetermined spot is exposed to the laser beam, detecting the magnetization direction of said predetermined spot with the laser beam by a magneto-optic effect, restoring the laser beam to its original intensity, reheating the predetermined spot with the laser beam to a temperature above 360° C. so that upon cooling below 360° C. to a temperature within said temperature range the predetermined spot returns to the low temperature crystallographic phase, and applying a magnetic filed sufficient to restore the predetermined spot to its original magnetization direction when said predetermined spot cools below 360° C. to a temperature within said temperature range.

11. The method of claim 10 wherein applying a magnetic field sufficient to restore said predetermined spot to its original magnetization direction comprises applying the magnetic field of about 500 Oersteds.

* * * * *